United States Patent
Mital et al.

(10) Patent No.: US 10,565,083 B2
(45) Date of Patent: Feb. 18, 2020

(54) SIMULATING HOSTED APPLICATION PERFORMANCE

(71) Applicant: Cisco Technology, Inc., San Jose, CA (US)

(72) Inventors: Subhav Mital, San Jose, CA (US); Lukas Krattiger, Pleasanton, CA (US); Shyam N. Kapadia, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 15/835,977

(22) Filed: Dec. 8, 2017

(65) Prior Publication Data

US 2019/0179725 A1  Jun. 13, 2019

(51) Int. Cl.
*G06F 15/173* (2006.01)
*G06F 11/34* (2006.01)
*H04L 12/26* (2006.01)
*H04L 29/08* (2006.01)

(52) U.S. Cl.
CPC .......... *G06F 11/3433* (2013.01); *H04L 43/04* (2013.01); *H04L 43/08* (2013.01); *H04L 67/10* (2013.01)

(58) Field of Classification Search
CPC ...... G06F 11/3433; H04L 43/04; H04L 43/08; H04L 67/10
USPC ........................................................ 709/224
See application file for complete search history.

(56) References Cited

U.S. PATENT DOCUMENTS

| 2005/0216234 | A1 | 9/2005 | Glas et al. |
| 2007/0282567 | A1 | 12/2007 | Dawson et al. |
| 2011/0054878 | A1 | 3/2011 | Zhang et al. |
| 2011/0125895 | A1 | 5/2011 | Anderson et al. |
| 2012/0259976 | A1* | 10/2012 | Bhagat ................. G06F 9/5083 709/224 |
| 2013/0290538 | A1 | 10/2013 | Gmach et al. |
| 2014/0289418 | A1* | 9/2014 | Cohen ................ G06F 11/3688 709/226 |
| 2016/0232036 | A1* | 8/2016 | Zhu ....................... H04L 67/303 |
| 2018/0203741 | A1* | 7/2018 | Banerjee ............... G06F 9/5077 |

(Continued)

OTHER PUBLICATIONS

Gui, et al., "A Service Brokering and Recommendation Mechanism for Better Selecting Cloud Services", Open Access, PLOS One, Aug. 29, 2014, 20 pgs.

(Continued)

*Primary Examiner* — Alan S Chou
(74) *Attorney, Agent, or Firm* — Edell, Shapiro & Finnan, LLC

(57) ABSTRACT

A computer-implemented method including causing an application to execute on a private cloud computing network, collecting first performance metrics associated with the application as a result of the application executing on the private cloud computing network, generating a simulated workload based on the first performance metrics, causing the simulated workload to execute on one or more public cloud computing networks, collecting second performance metrics associated with the simulated workload as the simulated workload is executing on the one or more public clouds, and generating, based on the second performance metrics, a recommendation of one of the one or more public cloud computing networks to host the application is disclosed.

20 Claims, 5 Drawing Sheets

(56) References Cited

U.S. PATENT DOCUMENTS

2019/0087301 A1* 3/2019 M .......................... H04L 67/38

OTHER PUBLICATIONS

Bodík, et al., "Statistical Machine Learning Makes Automatic Control Practical for Internet Datacenters", RAD Lab, EECS Department, UC Berkeley, Jun. 15, 2009, 5 pgs.

* cited by examiner

| PERFORMANCE METRIC | FIRST PUBLIC CLOUD COMPUTING NETWORK | SECOND CLOUD COMPUTING NETWORK | REQUESTED PERFORMANCE |
|---|---|---|---|
| TRANSACTIONS/MINUTE | 58,962 | 14,895 | >35,000 |
| PROCESSING POWER | 9.75 GFLOPS | 4.81 GFLOPS | >5.0 GFLOPS |
| EXHAUSTING PHYSICAL RESOURCES | NO | NO | NO |
| TIME THREADS ARE BUSY | 43% | 94% | <50% |
| AVERAGE PAGE SIZE | 2.3 MB | 1.8 MB | <2.0 MB |
| MEMORY LEAK PRESENT | YES | NO | NO |
| TIERS SCALING WITH LOAD | YES | YES | YES |

FIG.3

SIMULATING HOSTED APPLICATION PERFORMANCE

TECHNICAL FIELD

The present disclosure relates generally to cloud analytics and more particularly to analyzing public cloud computing network performance in connection with a given hosted application.

BACKGROUND

Cloud computing continues to grow as cloud computing offers multiple benefits. Examples of cloud computing benefits include cost savings, reliability, and manageability. A business desiring to host applications in a cloud computing network may avoid capital costs associated with buying and maintaining servers. Additionally, cloud computing networks often offer a Service Level Agreement (SLA), which may guarantee uptime and availability. Cloud computing may also increase the manageability through central administration and a vendor managed infrastructure. However, hosting applications in a cloud computing network, while having numerous benefits, poses several challenges. A user wishing to select a cloud computing network to host an application may have various criteria to meet such as latency, memory usage, and cost, among others, and at the same time, may have multiple cloud computing networks from which to select.

BRIEF DESCRIPTION OF THE DRAWINGS

FIG. 3 shows a table of performance metrics of first and second public cloud computing networks juxtaposed with requirements of a user, according to an example embodiment.

DESCRIPTION OF EXAMPLE EMBODIMENTS

Overview

Presented herein are techniques for simulating operations and performance of an application running on different public cloud computing networks, and recommending or selecting a given public cloud computing network to host the application based on simulated operations and performance. More specifically, in accordance with the techniques presented herein, an application to be hosted on a public cloud computing network is executed on a private cloud computing network. First performance metrics associated with the application are collected as a result of the application executing on the private cloud computing network. A simulated workload or model is generated based on the first performance metrics. The simulated workload or model is then executed on different public cloud computing networks, and performance metrics associated with the simulated workload or model executed on the different public cloud networks are collected. The performance metrics associated with the simulated workload or model executed on the different public cloud networks are used to select or recommend a given one of the one or more public cloud computing networks to host the application.

Example Embodiments

Public cloud computing networks have become an increasingly popular option to host applications. However, performance of a given application on a given public cloud computing network may not be known before a given public cloud computing network is selected to host the given application. Therefore, it may be beneficial for a user, such as an owner or administrator of the given application, to have an estimate for how each of the available public cloud computing networks performs with respect to a user's various performance criteria. For example, response performance for a given application hosted in a first public cloud computing network may vary greatly as compared with the response performance for the given application hosted in a second public cloud computing network. It may be helpful for the user to have an estimate of the performances for the two public cloud computing networks before selecting a public cloud computing network to host the given application.

Figure 1:
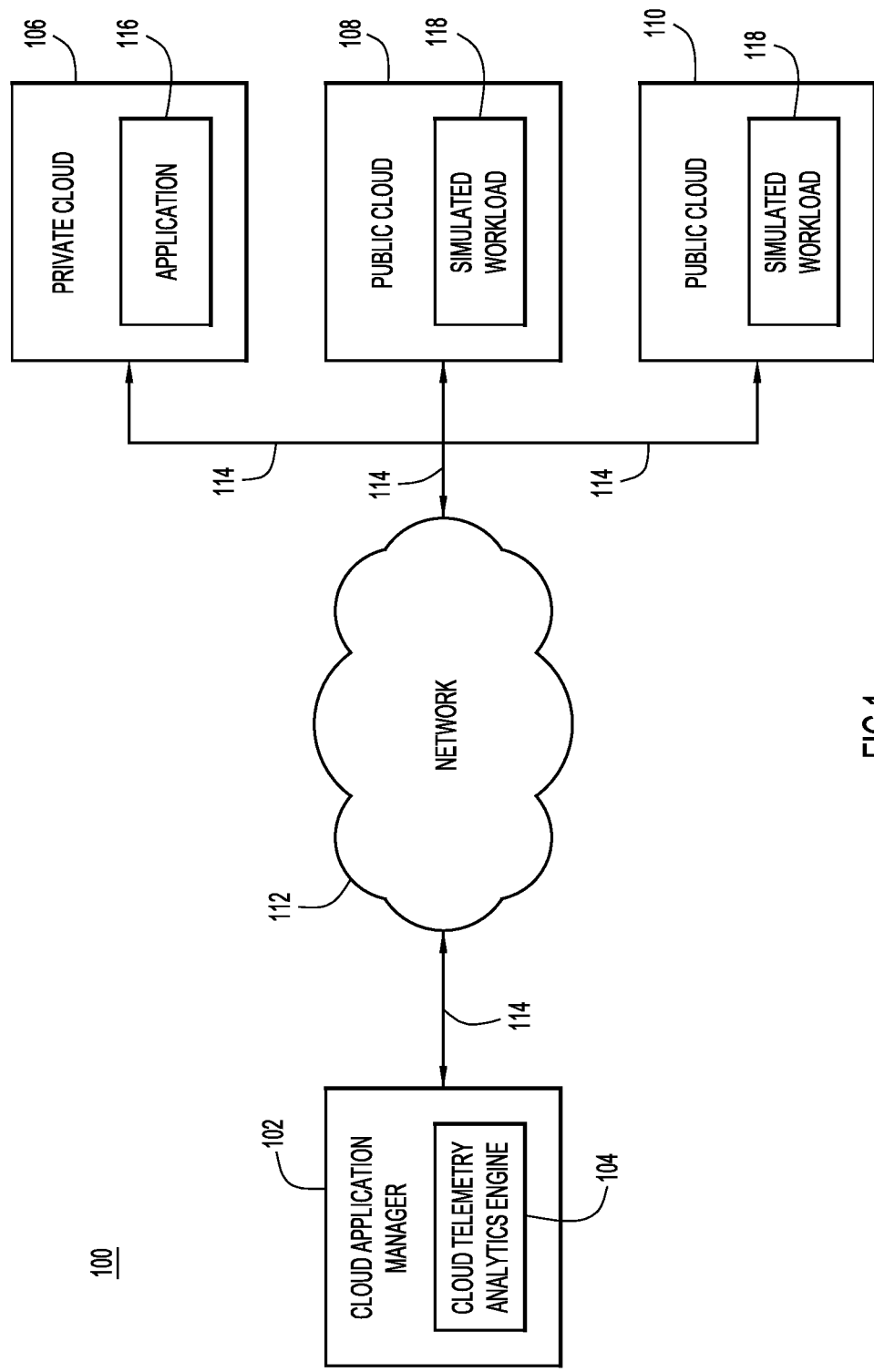
FIG. 1 is a block diagram of a system for recommending a public cloud computing network to host an application, according to an example embodiment.

With reference made to FIG. 1, shown is a block diagram of a system 100 for selecting or recommending a given public cloud computing network to host an application, according to an example embodiment.

The system 100 includes a cloud application manager 102, which may include a cloud telemetry analytics engine 104, a private cloud computing network 106, a first public cloud computing network 108, and a second public cloud computing network 110. For ease of illustration, FIG. 1 illustrates two public cloud computing networks 108 and 110. However, it is to be appreciated that the techniques presented herein may be implemented in systems that include more than two public cloud computing networks. The cloud application manager 102 may communicate with the private cloud computing network 106, the first public cloud computing network 108, and the second public cloud computing network 110 via network 112. The network 112 may be a local area network (LAN), a wireless local area network (WLAN), a wide area network (WAN), or a metropolitan area network (MAN), etc. The cloud application manager 102, private cloud computing network 106, first public cloud computing network 108, and second public cloud computing network 110 may communicate with the network 112 via communication links 114. The communication links 114 may be wired communication links, wireless communication links, or a combination of wired and wireless communication links.

In accordance with an embodiment, the private cloud computing network 106 may execute an application 116 that a user desires to be hosted on at least one of the first or second public cloud computing networks 108 and 110. As will be discussed in more detail herein, various performance metrics are generated when the application 116 executes on the private cloud network. Those metrics are then used to generate a simulated workload or model 118 of the application 116. The first and second public cloud computing networks 108 and 110 may then be caused to execute the simulated workload or model 118. A resulting output of executing the simulated workload 118 at the first and second public cloud computing networks 108 and 110 may then be used to generate a recommendation regarding which public cloud computing network is best suited to host the application 116.

The cloud application manager 102 includes the cloud telemetry analytics engine 104 that is configured to perform some of the techniques presented herein. Specifically, the cloud telemetry analytics engine 104 is configured to receive performance metrics from the private cloud computing network 106 as it executes application 116. The cloud telemetry analytics engine 104 may then generate a simulated workload or model 118 based on the received performance metrics from the private cloud computing network 106. Thereafter, the cloud telemetry analytics engine 104 causes the simulated workload or model 118 to be executed on the first and second public cloud computing networks 108 and 110, and receive resulting performance metrics from the first and the second public cloud computing networks 108 and 110. The performance metrics may indicate, for example, how well the hardware configuration of the private cloud computing network 106 and the first and second public cloud computing networks 108 and 110 execute the application 116. The cloud telemetry analytics engine 104 may then generate a recommendation based on performance metrics associated with the first and second public cloud computing networks 108 and 110. These features are described in further detail herein.

Additionally, the cloud telemetry analytics engine 104 may be configured to employ machine learning in connection with the performance metrics received from the public cloud computing network selected to host the application 116 as the application 116 is executing on the selected public cloud computing network. The machine learning may result in improved recommendations in connection with selecting which public cloud computing network to host a given application. This feature is also described in further detail herein.

Figure 2:
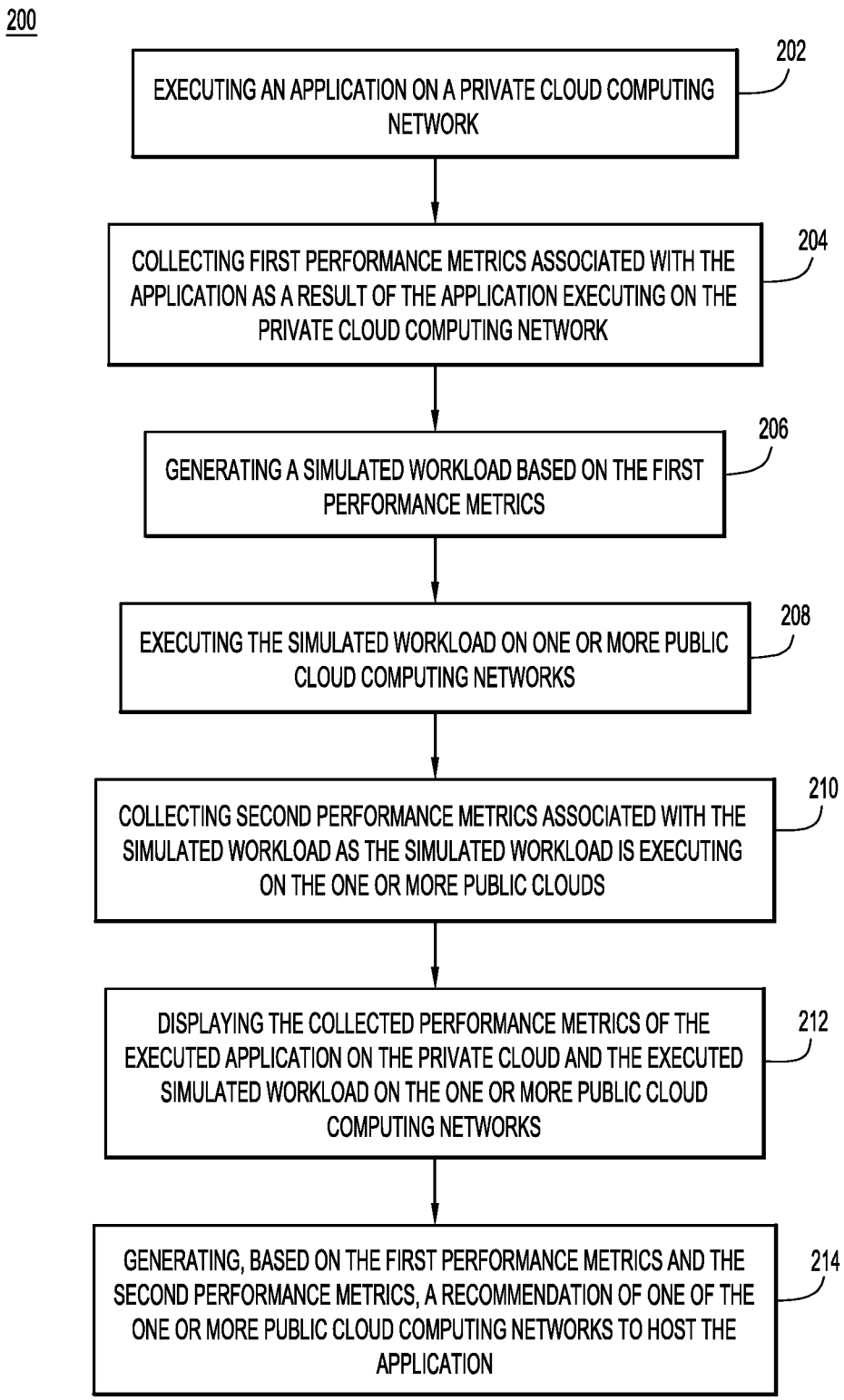
FIG. 2 illustrates a high-level flowchart of a method to carry out analysis and recommending techniques presented herein, according to an example embodiment.

Turning to FIG. 2, and with continuing reference to FIG. 1, illustrated is a high-level flowchart of a method 200 to carry out the techniques presented herein, according to an example embodiment. The method 200 begins at operation 202. At operation 202, the cloud application manager 102 determines, based on input received from a client, which application 116 is to be hosted on a public cloud computing network. The application 116 may be any application suitable to be hosted on a public cloud computing network, such as a web, media streaming, or e-commerce application, among others. After the application 116 has been selected, the application 116 may be built and deployed on the private cloud computing network 106. The private cloud computing network 106 may be used, for example, to test builds of the application 116 as the application 116 is being developed. The entire application 116, and not a model or simulation of the application 116, may be deployed on the private cloud computing network 106. The application 116 may then be executed on the private cloud computing network 106. In one embodiment, the private cloud computing network 106 and the cloud application manager 102 may be owned and/or operated by the same entity. In another embodiment, the private cloud computing network 106 may be owned and/or operated by the client (i.e., the user that desires to have an application hosted in a public cloud network) of the cloud application manager 102. After operation 202 is complete, the method 200 proceeds to operation 204.

At operation 204, the cloud telemetry analytics engine 104, via the cloud application manager 102, collects performance metrics of the application 116 as the application 116 is executing on the private cloud computing network 106. For example, the private cloud computing network 106 may transmit performance metrics to the cloud application manager 102 regarding the performance of application 116. That is, while the application 116 is executing, various performance metrics related to the execution of the application 116 on the private cloud computing network 106 may be generated. The performance metrics may be used as a benchmark for performance of the application 116. Performance metrics related to a web server may include, e.g., a number of busy and idle threads, throughput, and bandwidth requirements. For example, regarding busy and idle threads, performance metrics may indicate a need for more worker threads per web server, a need for more web servers, or whether a duration of threads being busy is too long because of application performance hotspots. Throughput performance metrics may include a number of transactions per minute handled, thus indicating a need to scale up by adding web servers. Bandwidth performance metrics may include data to determine whether and when the network 112 is a bottleneck, whether the average page delivered requires significant bandwidth, and whether content could be offloaded to a content distribution network (CDN).

Performance metrics related to an application server may also be generated. For example, metrics related to a load distribution, processing hotspots, worker threads, and memory usage may be relevant performance metrics for the application server. Load distribution performance metrics may include a number of transactions handled by each Java Virtual Machine (JVM), Common Language Runtime (CLR), or Hypertext Preprocessor (PHP) engine, for example. Additional load distribution performance metrics may include data to determine whether the application servers are equally load balanced and if more application servers are needed to handle the load of the network traffic. Regarding processing hotspots, performance metrics may include data to determine how much processing power is needed for a given test load, whether high processing usage is caused by non-optimized programming of the application 116, and whether the application servers need additional processing power. Relating to worker threads, performance metrics may include data to determine if the number of worker threads is correctly configured, if any worker threads are busy because the application server is not ready, and if there are any web server modules that block the execution of worker threads. Regarding memory usage, performance metrics may include data to determine whether there are any non-optimal memory patterns, whether there is a memory leak, and whether there might be an impact of garbage collection on processing and transaction throughput.

Performance metrics related to host health may also be generated. For example, metrics related to processing power, memory, storage, input/output, and key processes may be relevant performance metrics for the host. These metrics may include data to determine whether the application 116 is exhausting the physical or virtual resources of the host, if any storage devices have a large number of unnecessary files, such as log files, and if there are any problems on one or more network interfaces of the host. Additional metrics may include data to determine which processes are executing on the host, which processes are preventing other processes from using resources, and whether one or more of the processes is to be moved to another host.

Performance metrics related to application metrics may also be generated. For example, metrics related to time spent in a logical tier or layer and a number of calls into a logical tier or layer may be generated. More specifically, performance metrics related to data to determine which tier is spending more time with an increasing network traffic load and which tiers are scaling with the network traffic load and which tiers are not scaling with the network traffic load. Additionally, performance metrics related to data to determine how often internal web services are called and how often critical application programming interfaces (APIs) are called may be collected. These foregoing performance metrics serve as examples and should not be taken to be limiting the type or the number of performance metrics generated and collected.

The performance metrics may be generated for a given amount of network traffic. However, the performance metrics may change depending on an intensity of the network traffic. For example, lighter network traffic may not require as many web servers or require less processing power. In contrast, heavier network traffic may require many webservers or require more processing power. Therefore, performance metrics may be generated for varying amounts of network traffic to obtain more comprehensive performance metrics of the application 116 in the private cloud computing network 106. In some embodiments, selected performance metrics may be used as part of a weighted average for the performance of the application 116. For example, if the application 116 is expected to receive heavy network traffic, the performance metrics for heavier network traffic may be given greater weight than the performance metrics for lighter network traffic. After operation 204 is complete, the method 200 proceeds to operation 206.

At operation 206, after the performance metrics have been generated for various amounts of network traffic, the performance metrics generated as the application 116 executes on the private cloud computing network 106 may be used to generate the simulated workload or model 118. The simulated workload or model 118 models the performance of the application 116 with regard to the collected performance metrics. In one embodiment, the cloud analytics telemetry engine 104 may generate the simulated workload or model 118. The simulated workload or model 118 replicates the application 116 using the collected performance metrics without replicating data associated with the application 116. The simulated workload or model 118 may be loaded and executed on the first and second public cloud computing networks 108 and 110. One potential advantage of executing the simulated workload or model 118 instead of the application 116 itself on the first and second public cloud computing networks 108 and 110 is that the simulated workload or model 118 is more portable than the entire application 116. In other words, it is easier to run the simulated workload or model 118 on the first and second public cloud computing networks 108 and 110 than it is to build and deploy the entire application 116 on the first and second public cloud computing networks 108 and 110 because other aspects of the application 116, such as data associated with the application 116, are not in the simulated workload or model 118. Another potential benefit is that the simulated workload or model 118 enables a user to determine an expected performance of the application 116 on the first and second public cloud computing networks 108 and 110 without building and deploying the entire application 116 on the first and second public cloud computing networks 108 and 110. This may save both time and computing resources. After operation 206 is complete, the method 200 proceeds to operation 208.

At operation 208, the simulated workload or model 118 generated at operation 206 is executed on the first and second public cloud computing networks 108 and 110. Specifically, the first and second public cloud computing networks 108 and 110 may make available various application programming interfaces (APIs) via which the simulated workload or model 118 can be provided to the first and second public cloud computing networks 108 and 110. The APIs may also accept indications of various network traffic levels. The various network traffic levels may be input into the simulated workload or model 118. By varying the network traffic levels input into the simulated workload or model 118, varying demand for the application 116 and the resulting performance metrics may be generated. After operation 208 is complete, the method 200 proceeds to operation 210.

At operation 210, the performance metrics generated by the first and second public cloud computing networks 108 and 110 generated by the simulation of operation 208 are collected. The first and second public cloud computing networks 108 and 110 may transmit the performance metrics to the cloud application manager 102 via the APIs. For example, the cloud telemetry analytics engine 104 may collect the performance metrics generated by the first and second public cloud computing networks 108 and 110 via the cloud application manager 102. The performance metrics collected from the first and second public cloud computing networks 108 and 110 may be the same as the performance metrics collected from the application 116 executing on the private cloud computing network 106 described above. In some embodiments, the performance metrics collected from the first and second public cloud computing networks 108 and 110 may be different from the performance metrics collected from the private cloud computing network 106. Additionally, the performance metrics collected from the first public cloud computing network 108 may be different from the performance metrics collected from the second public cloud computing network 110. However, to increase a utility of a comparison of the first and second public cloud computing networks, it is beneficial that the collected performance metrics are the same, or at least relatively similar, to one another. After operation 210 is complete, the method 200 may proceed to operation 212.

At operation 212, the cloud application manager 102 may display the collected performance metrics from the first and second public cloud computing networks 108 and 110 through a graphical user interface. In some embodiments, the cloud application manager 102 may also display the performance metrics of the application 116 as it was executing on the private cloud computing network 106. For example, the cloud application manager may include a display (shown in FIG. 5) configured to display the performance metrics. The performance metrics may be displayed in any suitable manner, such as in a table or graph. After operation 212 is complete, the method 200 proceeds to operation 214.

At operation 214, the cloud telemetry analytics engine 104 generates, based on the collected performance metrics from the first and second public cloud computing networks 108 and 110, a recommendation to select one of the first and second public cloud computing networks 108 and 110 on which to host the application 116. The recommendation may be based on a comparison between the collected performance metrics from the first and second public cloud computing networks 108 and 110 and the requirements of the user of the cloud application manager 102. For example, the user may have a user profile that indicates a variety of performance metrics that may be of higher importance for the application 116. In one embodiment, performance metrics related to memory performance and computer processing power may be the most important, i.e., the user may specify certain minimum values of memory performance and computer processing power. In another embodiment, the user profile may indicate that cost and latency may be the most important metrics. The cloud telemetry analytics engine 104 may thus compare the performance metrics of the first and second public cloud network providers 108 and 110 in the context of user preferences. The public cloud computing network that meets the most of the user's requirements may be the recommended public cloud computing network to host the application 116. In other embodiments, when there are more than two public cloud computing networks available, the cloud telemetry analytics engine 104 may recommend a certain number of public cloud computing networks, such as the top two public cloud computing networks for the application, given the user's requirements. The user may then choose which of the two recommended public cloud computing networks to host the application 116. After operation 214 is complete, the method 200 may end.

Turning to FIG. 3, shown is a table 300 of example performance metrics 301 of the first and second public cloud computing networks 108 and 110 and requests or criteria of the user, according to an example embodiment. The table 300 is a graphical representation of data that may be stored in a memory (shown in FIG. 5) of the cloud application manager 102. In this example, the performance metrics 301 are the transactions per minute performed 302, the computing processing power 304, whether the application 116 has exhausted the physical resources 306, a percentage of the amount of time threads are busy 308, an average page size 310, whether a memory leak is present 312, and whether the tiers scale with the network traffic load 314. These performance metrics 301 were collected from the first and second public cloud computing networks 108 and 110 as the simulated workload or model 118 was executing. The table 300 also displays the performance requirements provided by the user/owner/client responsible for the application 116.

For transactions per minute performed 302, the user requested a minimum of 35,000 transactions per minute. The first public cloud computing network 108 performed 58,962 transactions per minute while the second public cloud computing network 110 performed 14,895 transactions per minute. In this example, the first public cloud computing network 108 meets the requirements of the user while the second public cloud computing network 110 does not. For computing processing power 302, the user required a minimum of 5.0 giga floating point operations per second (GFLOPS). The first public cloud computing network 108 performed 9.75 GFLOPS while the second public cloud computing network performed 4.81 GFLOPS. Therefore, the first public cloud computing network 108 meets the requirements of the user while the second public cloud computing network 110 does not. For determining whether the application 116 has exhausted the physical resources of the public cloud computing networks, the user requested that the application 116 not exhaust the physical resources. In this example, neither the first nor the second public cloud computing networks 108 and 110 had their physical resources exhausted. Therefore, both the first and second public cloud computing networks 108 and 110 satisfies this request. For the percentage of time the threads are busy 308, the user requested that the percentage be less than 50%. The first public cloud computing network 108 meets this request because the threads were busy 43% of the time while the second public cloud computing network 110 does not meet this request because the threads were busy 94% of the time. For the average page size 310, the user requested that the average page size be less than 2.0 MB. In this example, the first public cloud computing network 108 did not meet this request as the average page size was 2.3 MB. The second public cloud computing network 110, however, did meet this request as the average page size was 1.8 MB. For determining whether a memory leak is present 312, the user requested that a memory leak not be present. Here, the first public cloud computing network 108 indicates there was a memory leak while the second public cloud computing network 110 indicates that there was not a memory leak. Therefore, only the second public cloud computing network 110 satisfies this request. For determining whether the tiers scale with the network traffic, the user requested that the public cloud computing networks do scale with network traffic. Here, both the first and second public cloud computing networks 108 and 110 scale with the network traffic and satisfy the request.

Overall, the first public cloud computing network 108 satisfies five of the requests and the second public cloud computing network 110 satisfies four of the requests. Because the first public cloud computing network 108 satisfies more requests than the second public cloud computing network 110, the cloud telemetry analytics engine 104 may recommend to the user that the first public cloud computing network 108 host the application 116. In some embodiments, the cloud telemetry analytics engine 104 may, in addition to recommending, select the first public cloud computing network 108 to host the application 116. Those skilled in the art will also appreciate that the various metrics can be weighted such that scoring of respective public cloud networks performance is based on, e.g., a weighted average.

After the cloud telemetry analytics engine 104 makes a recommendation regarding which public cloud computing network to use and the user has selected a public cloud computing network, the application 116 may be built and deployed on the selected public cloud computing network. As the application 116 is executing on the selected public cloud computing network, the cloud application manager 102 may receive performance metrics of the application 116 from the selected public cloud computing network. These metrics may be used as input to a machine learning algorithm implemented by, for example, the cloud telemetry analytics engine 104. The machine learning algorithm may be used to improve the recommendation generated by the cloud telemetry analytics engine, as described below.

Figure 4:
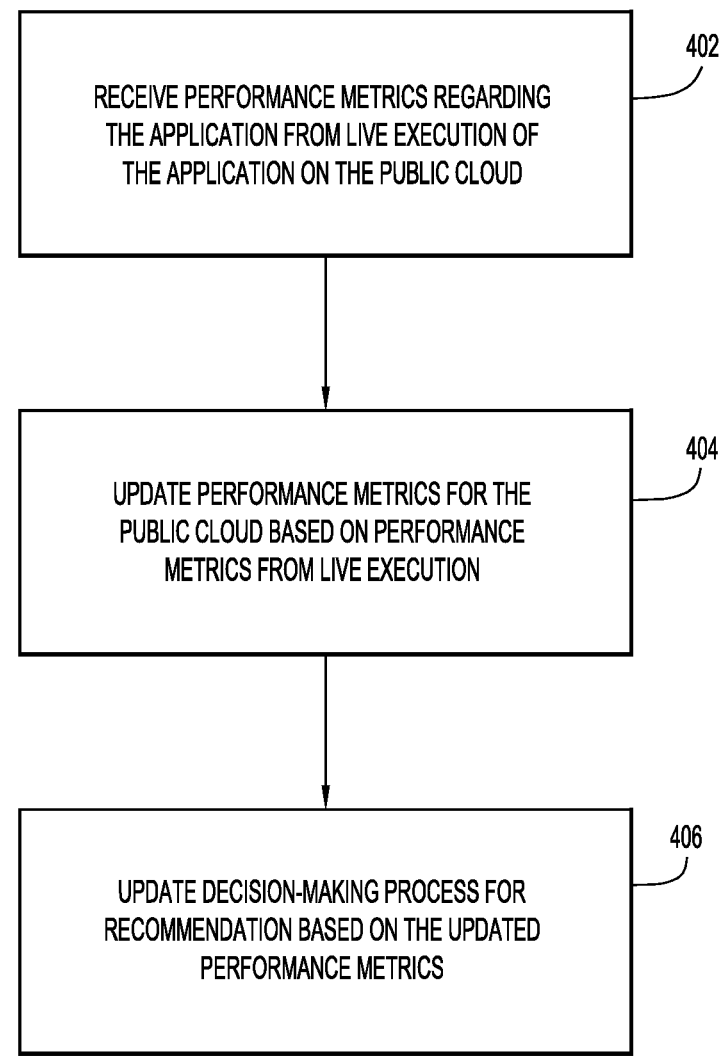
FIG. 4 illustrates a high-level flowchart of a method to carry out follow-on analysis of the performance of a hosted application on a given public cloud computing network, according to an example embodiment

Turning to FIG. 4, and with reference to FIG. 3, illustrated is a high-level flowchart of a method 400 to carry out machine learning techniques, according to an example embodiment. The method 400 begins at operation 402. At operation 402, the cloud application manager 102 receives performance metrics from execution of the application 116 on the selected public cloud computing network. For example, the first public cloud computing network 108 may have been recommended to the user and selected by the user to host the application 116, as discussed above with reference to FIG. 3. The received performance metrics may be the same performance metrics received while the simulated workload or model 118 executed on the first public cloud computing network 108. After operation 402 is complete, the method 400 proceeds to operation 404.

At operation 404, the cloud telemetry analytics engine 104 updates the performance metrics of the first public cloud computing network 108 with the performance metrics collected at operation 402, as described above. Updating the performance metrics may occur in several ways. For instance, the previous performance metrics for the first public cloud computing network 108 may be overwritten with the updated performance metrics. In this instance, historical performance data for the first public cloud computing network 108 has no impact. In another embodiment, the cloud telemetry analytics engine 104 may produce a weighted average of a predetermined number of previous performance metrics. For example, the cloud telemetry analytics engine 104 may use the past five sets of performance metrics from the first public cloud computing network 108, with greater weight being given to the more recent performance metrics sets. In another embodiment, each of the previous performance metrics may be weighted equally. After operation 404 is complete, the method 400 proceeds to operation 406.

At operation 406, the cloud telemetry analytics engine 104 updates the recommendation regarding which public cloud computing network to use. For example, referring to FIG. 3, the cloud telemetry analytics engine 104 recommended the first public cloud computing network 108 to host the application based on the simulated workload or model 118. However, if, over time, the performance of the first public cloud computing network 108 degrades to the extent that the performance metrics associated with the first public cloud computing network 108 are less suitable to the requests of the user, the cloud telemetry analytics engine 104 may recommend to the user to host the application 116 on the second public cloud computing network 110. After operation 406 completes, the method 400 ends.

In this manner, the techniques described herein may result in a number of advantages. For example, the user may make better decisions regarding which public cloud computing network to select to host the application 116 by using the collected performance metrics generated by the simulations of the simulated workload or model 118. Using these performance metrics, the user may be able to deploy the application 116 more quickly than before. Additionally, bandwidth and public cloud computing network resource usage may be optimized. This may result in improving a quality of interacting with the application 116 while it is deployed in a public cloud computing network. These techniques may also result in reduced operational expenditures and capital expenditures, thereby lowering a total cost of ownership.

Figure 5:
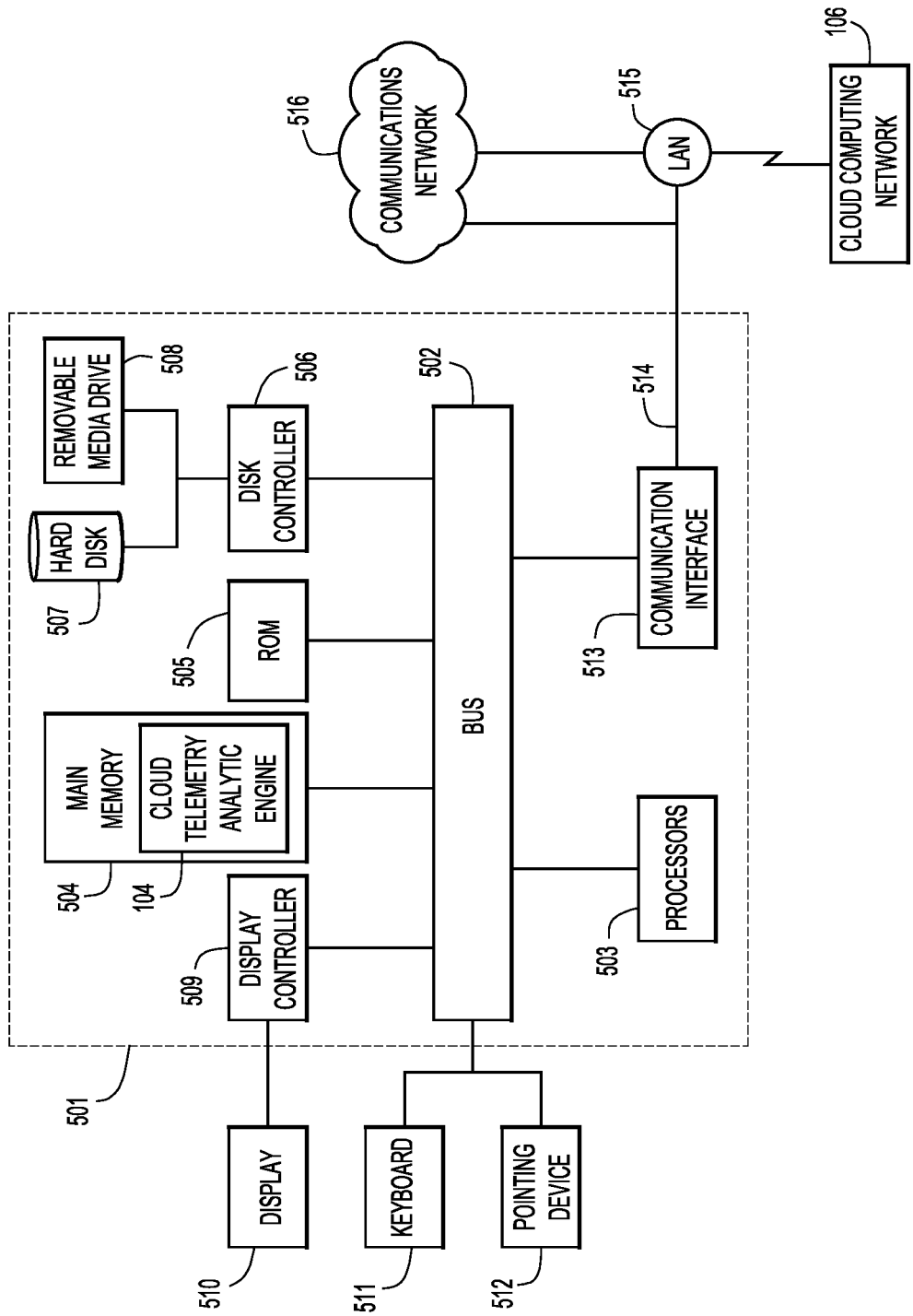
FIG. 5 shows a block diagram of an apparatus on which cloud application manager configured to perform described analysis and recommending techniques, according to an example embodiment.

Turning to FIG. 5, shown is a block diagram of a server, e.g., cloud application manager 102 shown in FIG. 1, configured to perform the telemetry, recommendation, and machine learning techniques, according to an example embodiment. FIG. 5 illustrates a computer system 501 upon which the embodiments presented may be implemented. The computer system 501 includes a bus 502 or other communication mechanism for communicating information, and a processor 503 coupled with the bus 502 for processing the information. While the figure shows a single block 503 for a processor, it should be understood that the processors 503 represent a plurality of processing cores, each of which can perform separate processing. The computer system 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processor 503.

The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT), for displaying information to a computer user. The computer system 501 includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510.

The computer system 501 performs a portion or all of the processing steps of the process in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the process, and for enabling the computer system 501 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 112 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 112. The local network 514 and the communications network 112 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a cloud computing network 106.

In one aspect of this disclosure, a computer-implemented method includes causing an application to execute on a private cloud computing network, collecting first performance metrics associated with the application as a result of the application executing on the private cloud computing network, generating a simulated workload based on the first performance metrics, causing the simulated workload to execute on one or more public cloud computing networks, collecting second performance metrics associated with the simulated workload as the simulated workload is executing on the one or more public clouds, and generating, based on the second performance metrics, a recommendation of one of the one or more public cloud computing networks to host the application is disclosed.

More particularly, the recommendation is based on one of a set of user profiles.

In another aspect, the generating further includes after the application is deployed on one of the public cloud computing networks, obtaining updated performance metrics regarding the application as it is executing on one of the public cloud computing networks, and updating a decision-making process for the recommendation based on the updated performance metrics.

In another embodiment, the improving further includes performing machine learning using the updated performance metrics.

In another example embodiment, the machine learning is performed on updated performance metrics from multiple executions of the application after it is deployed on the one or more public cloud computing networks.

In yet another aspect, executing the application on the private cloud computing network further includes dynamically generating payload traffic to simulate a variety of network traffic loads.

In one embodiment, the first and second performance metrics include at least one web server metric, wherein the web server metric is at least one of busy and idle threads, throughput, or bandwidth requirements.

In another embodiment, the first and second performance metrics include at least one application server metric, wherein the application server metric is at least one of load distribution, central processing unit (CPU) hotspots, or worker threads.

In yet another example embodiment, the first and second performance metrics include at least one application metric, wherein the application metric is at least one of time spent in a logical tier or a number of calls into a logical tier.

In one aspect of this disclosure, an apparatus includes a communication interface configured to enable network communications, a processor coupled with the communication interface to communicate with at least a private cloud computing network and one or more public cloud computing networks, the processor configured to: cause an application to execute on a private cloud computing network, collect first performance metrics associated with the application as a result of the application executing on the private cloud computing network, generate a simulated workload based on the first performance metrics, cause the simulated workload to execute on one or more public cloud computing networks, collect second performance metrics associated with the simulated workload as the simulated workload is executing on the one or more public clouds, and generate, based on the second performance metrics, a recommendation of one of the one or more public cloud computing networks to host the application is disclosed.

In yet another aspect, there is provided one or more non-transitory computer readable storage media encoded with instructions that, when executed by a processor, cause the processor to: cause an application to execute on a private cloud computing network, collect first performance metrics associated with the application as a result of the application executing on the private cloud computing network, generate a simulated workload based on the first performance metrics, cause the simulated workload to execute on one or more public cloud computing networks, collect second performance metrics associated with the simulated workload as the simulated workload is executing on the one or more public clouds, and generate, based on the second performance metrics, a recommendation of one of the one or more public cloud computing networks to host the application is disclosed.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
   at a server configured to connect in a network for communication with at least a private cloud computing network and one or more public cloud computing networks,
      causing an application to execute on the private cloud computing network;
      collecting first performance metrics associated with the application as a result of the application executing on the private cloud computing network;
      generating a simulated workload based on the first performance metrics;
      causing the simulated workload to execute on the one or more public cloud computing networks;
      collecting second performance metrics associated with the simulated workload as the simulated workload is executing on the one or more public cloud computing networks; and
      generating, based on the second performance metrics, a recommendation of one of the one or more public cloud computing networks to host the application.

2. The computer-implemented method of claim 1, wherein the recommendation is based on one of a set of user profiles.

3. The computer-implemented method of claim 1, wherein the generating further comprises:
   after the application is deployed on one of the public cloud computing networks, obtaining updated performance metrics regarding the application as it is executing on one of the public cloud computing networks; and
   updating a decision-making process for the recommendation based on the updated performance metrics.

4. The computer-implemented method of claim 3, wherein the updating further comprises:
   performing machine learning using the updated performance metrics.

5. The computer-implemented method of claim 4, wherein the machine learning is performed on updated performance metrics from multiple executions of the application after it is deployed on the one or more public cloud computing networks.

6. The computer-implemented method of claim 1, wherein executing the application on the private cloud computing network further comprises:
   dynamically generating payload traffic to simulate a variety of network traffic loads.

7. The computer-implemented method of claim 1, wherein the first and second performance metrics include at least one web server metric, wherein the web server metric is at least one of busy and idle threads, throughput, or bandwidth requirements.

8. The computer-implemented method of claim 1, wherein the first and second performance metrics include at least one application server metric, and wherein the application server metric is:
   at least one of load distribution, central processing unit (CPU) hotspots, or worker threads; or
   at least one of time spent in a logical tier or a number of calls into a logical tier.

9. The computer-implemented method of claim 1, wherein the server further comprises a communication interface, and wherein causing the simulated workload to execute on the one or more public cloud computing networks further comprises:
   providing the simulated workload over the communication interface to the one or more public cloud computing networks to execute on the one or more public cloud computing networks.

10. An apparatus comprising:
    a communication interface configured to enable network communications;
    a processor coupled with the communication interface to communicate with at least a private cloud computing network and one or more public cloud computing networks, the processor configured to:
      cause an application to execute on the private cloud computing network;
      collect via the communication interface first performance metrics associated with the application as a result of the application executing on the private cloud computing network;
      generate a simulated workload based on the first performance metrics;
      provide the simulated workload via the communication interface to the one or more public cloud computing networks to execute on the one or more public cloud computing networks;
      collect via the communication interface second performance metrics associated with the simulated workload as the simulated workload is executing on the one or more public cloud computing networks; and
      generate, based on the second performance metrics, a recommendation of one of the one or more public cloud computing networks to host the application.

11. The apparatus of claim 10, wherein the recommendation is based on one of a set of user profiles.

12. The apparatus of claim 10, wherein the processor is further configured to:
    after the application is deployed on one of the public cloud computing networks, obtain updated performance metrics regarding the application as it is executing on one of the public cloud computing networks; and
    updating a decision-making process for the recommendation based on the updated performance metrics.

13. The apparatus of claim 12, wherein the processor is further configured to:
   perform machine learning using the updated performance metrics.

14. The apparatus of claim 13, wherein the machine learning is performed on updated performance metrics from multiple executions of the application after it is deployed on the one or more public cloud computing networks.

15. The apparatus of claim 10, wherein when the processor executes the application on the private cloud computing network, the processor is further configured to:
   dynamically generate payload traffic to simulate a variety of network traffic loads.

16. The apparatus of claim 10, wherein the first and second performance metrics include at least one web server metric, wherein the web server metric is at least one of busy and idle threads, throughput, or bandwidth requirements.

17. The apparatus of claim 10, wherein the first and second performance metrics include at least one application server metric, wherein the application server metric is at least one of load distribution, central processing unit (CPU) hotspots, or worker threads.

18. The apparatus of claim 10, wherein the first and second performance metrics include at least one application metric, wherein the application metric is at least one of time spent in a logical tier or a number of calls into a logical tier.

19. A computer program product comprising:
   one or more non-transitory computer readable storage media;
   instructions encoded on the non-transitory computer readable storage media;
   the instructions being executable by a processor of a server configured to connect in a network for communications in order to:
      cause an application to execute on a private cloud computing network;
      collect first performance metrics associated with the application as a result of the application executing on the private cloud computing network;
      generate a simulated workload based on the first performance metrics;
      cause the simulated workload to execute on one or more public cloud computing networks;
      collect second performance metrics associated with the simulated workload as the simulated workload is executing on the one or more public cloud computing networks; and
      generate, based on the second performance metrics, a recommendation of one of the one or more public cloud computing networks to host the application.

20. The computer program product of claim 19, wherein the recommendation is based on one of a set of user profiles.

* * * * *